United States Patent [19]
Kikuchi et al.

[11] Patent Number: 6,131,139
[45] Date of Patent: Oct. 10, 2000

[54] APPARATUS AND METHOD OF SIMULTANEOUSLY READING AND WRITING DATA IN A SEMICONDUCTOR DEVICE HAVING A PLURALITY OF FLASH MEMORIES

[75] Inventors: Shuuichi Kikuchi, Esashi; Seiji Hiraka, Mizusawa; Tsutomu Sugawara, Iwate-ken, all of Japan

[73] Assignee: Tokyo Electron Limited, Tokyo, Japan

[21] Appl. No.: 08/789,544

[22] Filed: Jan. 27, 1997

[30] Foreign Application Priority Data

Jan. 25, 1996 [JP] Japan .................................. 8-030144
Feb. 1, 1996 [JP] Japan .................................. 8-037054

[51] Int. Cl.$^7$ .................................................. G06F 12/02
[52] U.S. Cl. ..................... 711/103; 711/168; 365/185.33; 365/189.04; 365/230.03
[58] Field of Search .................................. 711/103, 168, 711/5, 104, 115, 173; 365/230.03, 185.33, 189.04

[56] References Cited

U.S. PATENT DOCUMENTS

| | | | |
|---|---|---|---|
| 5,388,248 | 2/1995 | Robinson et al. | 711/101 |
| 5,524,230 | 6/1996 | Sakaue et al. | 711/103 |
| 5,761,702 | 6/1998 | Matsufuji | 711/103 |

Primary Examiner—Hiep T. Nguyen
Attorney, Agent, or Firm—Oblon, Spivak, McClelland, Maier & Neustadt, P.C.

[57] ABSTRACT

A method, apparatus and system for controlling the reading and writing of flash memories including a write control section, a plurality of read enable control signal lines and a read control section. The write control section configured to supply a write command, a write head address and first data to each of the flash memories through a bus at a predetermined timing to cause one of the flash memories to perform a write mode for writing sequentially first data from a memory address of a corresponding one of the flash memories which is accessed by the write head address in response to the write command, the write head address and first data being supplied at a predetermined timing without fetching any external signal within a first time period. The plurality of read enable control signal lines connected to the plurality of flash memories, respectively, to assign individually a plurality of read enable control signals to the flash memories via the signal lines. The read control section configured to supply a read command and a read head address to another one of the flash memories at a predetermined timing within a second time period which is at least shorter than the first time period through the bus to cause the another one of the flash memories to perform a read mode for reading sequentially second data from a memory address of the another one of the flash memories which is accessed by the read head address in response to the read command within the second time period, set the second data to an output port, and send the second data at the output port to the bus in response to an assigned one of the read enable control signals.

9 Claims, 11 Drawing Sheets

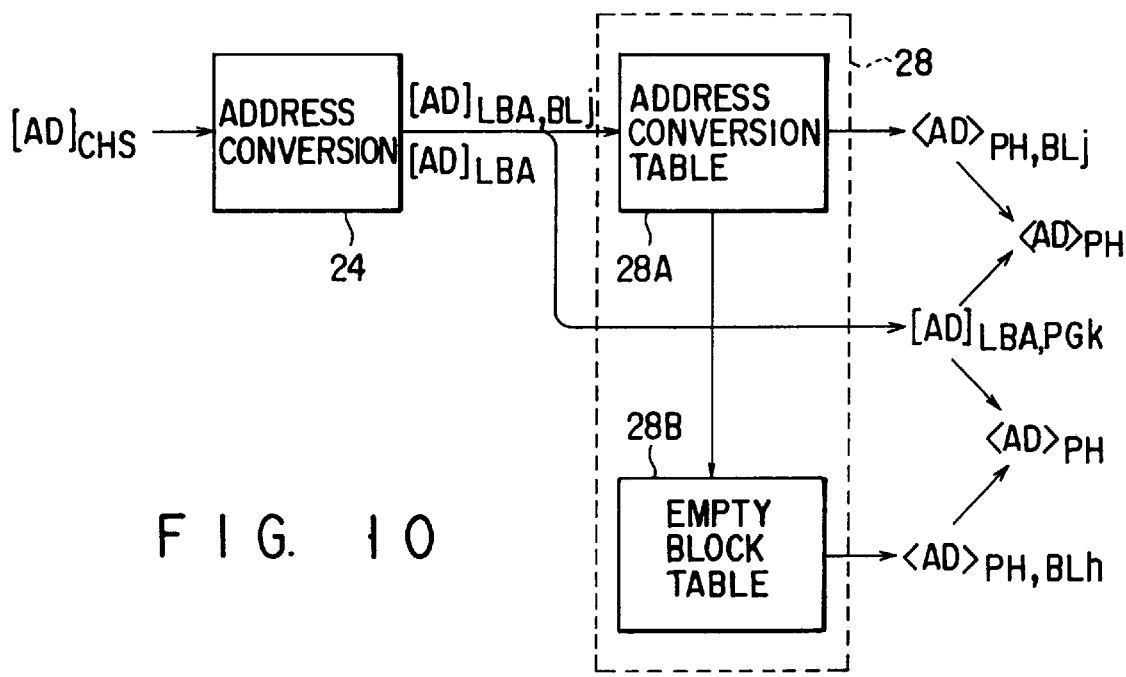
F I G. 10
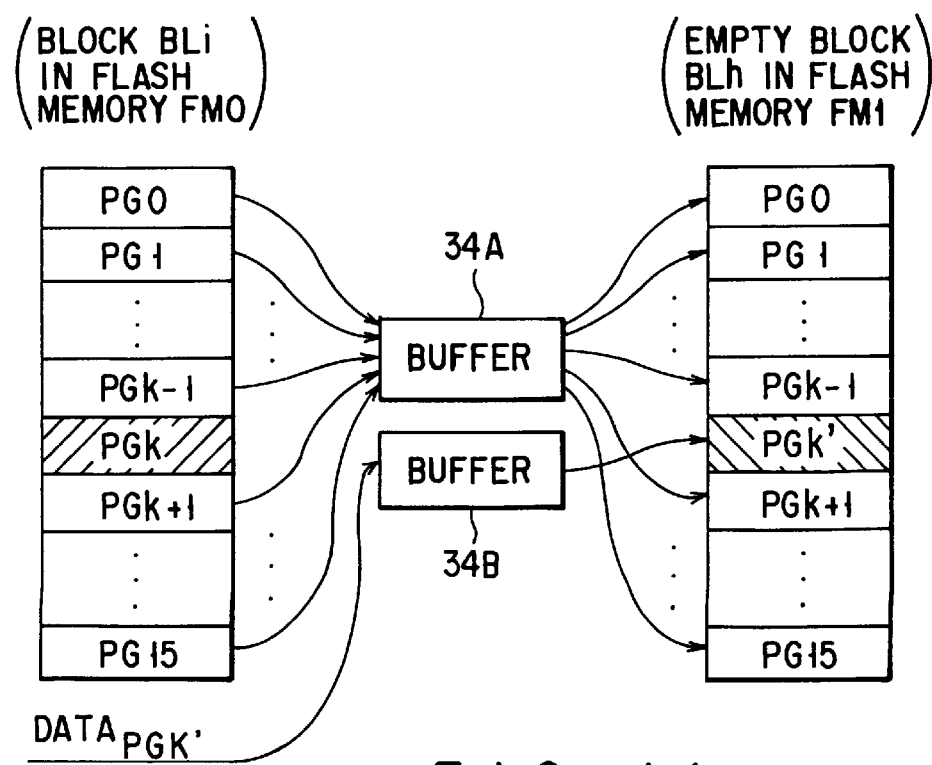
F I G. 11

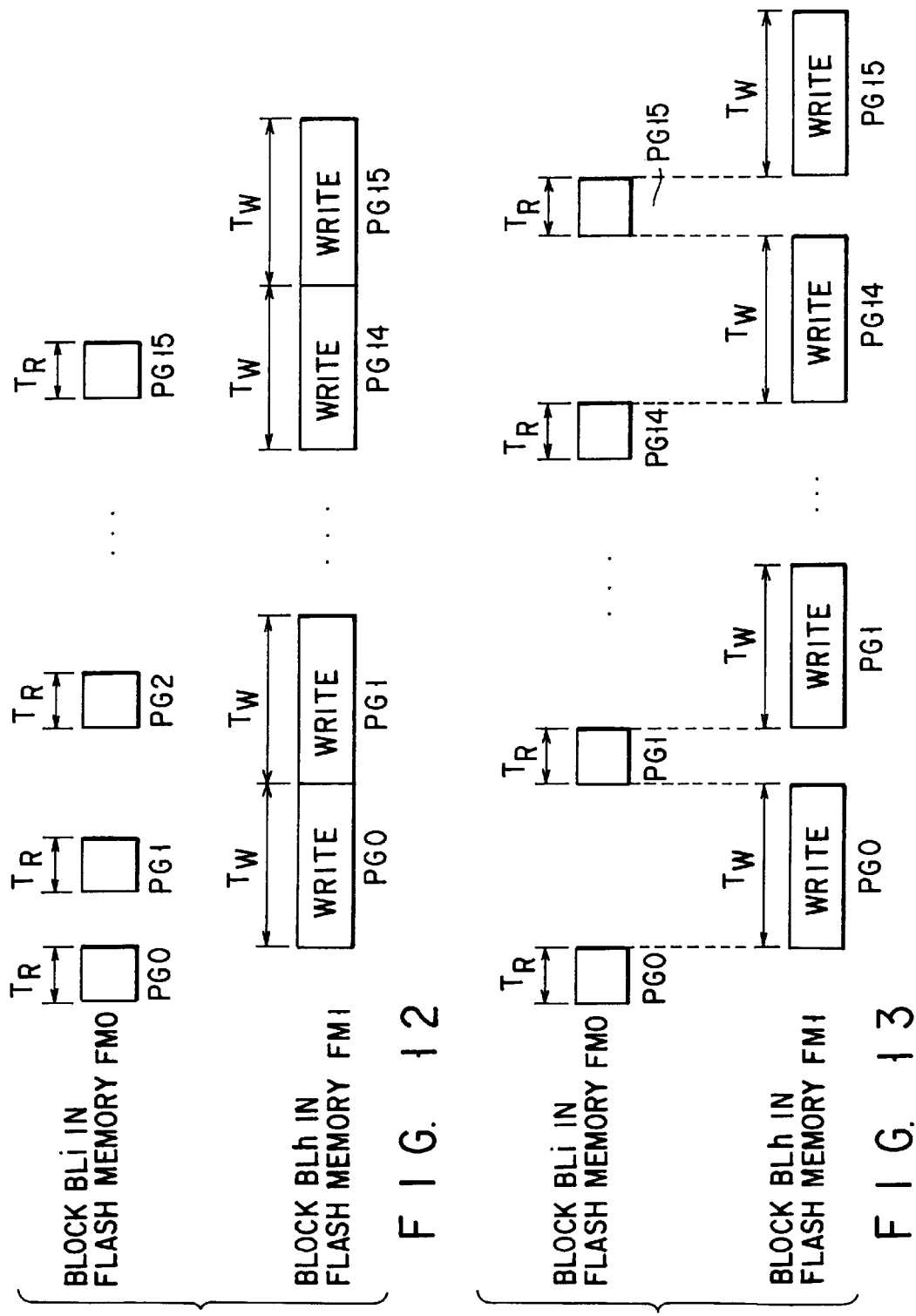

APPARATUS AND METHOD OF SIMULTANEOUSLY READING AND WRITING DATA IN A SEMICONDUCTOR DEVICE HAVING A PLURALITY OF FLASH MEMORIES

BACKGROUND OF THE INVENTION

The present invention relates to a memory apparatus including a plurality of semiconductor memories, and more particularly to a method and an apparatus for reading plural data respectively stored at the same memory addresses of a plurality of semiconductor memories of the memory apparatus.

In recent year, a flash memory (a flash EEPROM) has attracted attention as a semiconductor memory which is available in place of a magnetic memory, such as a hard disk or a floppy disk. The flash memory is a nonvolatile semiconductor memory which exhibits small electric power consumption and which can be rewritten. Since the flash memory has a light weight and having satisfactory vibration resistance, it has been widely used in a portable apparatus.

In general, a computer system having the flash memory as an external memory device thereof has a controller provided for only the flash memory. A host computer (for example, a personal computer) is required to command the controller to write or read data. The controller receives a command issued from the host computer to directly control the flash memory to write or read data. Moreover, the controller performs memory control, such as batch erase, which is inherent to the flash memory.

Hitherto, a plurality of chips each containing a controller and a plurality of NAND flash memories have been mounted on one card. When the memory card has been loaded into a card slot of the host computer, the controller is connected to the host computer through an interface, such as a PCMCIA-ATA interface of an IDE interface having a predetermined specification.

The controller is, on the card, connected to each flash memory through an internal bus of, for example, 8-bit width, a single common control line for all of the flash memories and control lines respectively assigned to the flash memories.

In the above-mentioned structure, the controller maintains a chip enable control signal at an active level (L level) during the overall reading operation period to maintain the flash memories at a chip enable (active) state.

In this case, the controller initially makes active (H level) the command latch enable control signal to transmit a read command having a predetermined code onto the bus. Simultaneously, the controller makes active (L level) the write enable control signal. As a result, the flash memories fetch the read command in response to the command writing operation performed by the controller.

Then, the controller makes active (H level) the address latch enable control signal to transmit a read address having a predetermined number of bits while dividing the operation into three portions. Whenever the controller transmits the read address, the controller makes active (L level) the write enable control signal. In response to the address write operation performed by the controller, the flash memories fetch the address to start performing the memory reading operation.

That is, the conventional reading method is arranged such that the flash memory decodes the supplied read command and the read address, reads data from a memory address or a region accessed by the read address, and sets read data to a predetermined output port or a buffer. Since the operation for reading the memory takes a predetermined time, the flash memory maintains a busy signal at an active level (L level) during the foregoing processing period to bring the controller to a standby state.

After the operation for reading the flash memory has been completed and thus the busy state has been suspended, the controller starts performing an operation for fetching read data from the output port of the flash memory.

In general, data is, in the form of a group, written/read to and from the flash memory. The read address, which is supplied from the controller to the flash memory to read data, is a memory address from which data is read or an address (head address) instructing a position in a region from which data is read. However, the controller repeatedly makes active (L level) the read enable control signal to fetch data from the output port of the flash memory by one byte at a time through a bus so as to read data in one group from a required memory region in the flash memory accessed by the read address.

A flash memory of the foregoing type has a memory array in the chip thereof which is divided into a plurality of sections, for example, 512 blocks. Each block is divided into a plurality of pages or sectors, for example, 16 pages or 16 sectors. In general, programming (writing) and reading are performed in page units, while deleting is performed in block units.

Each page includes a data region having a predetermined capacity, for example, 512 bytes and a redundant region having a predetermined capacity, for example, 16 bytes. The data region is essential data memory region. The redundant region is sectioned into several fields including a conversion address region. The conversion address region stores a logical address used in writing data whenever data is written on the sector from the host computer.

When viewed from the host computer, the host computer considers the memory region of the flash disk as a predetermined memory space or an I/O space and makes an access to the memory with the logical address. However, the controller administrates the memory regions in the card in block units in a scattering manner and the memory access is made with a physical address. Therefore, an address conversion table for making the logical addresses and the physical addresses to correspond to one another is formed in a table memory (SRAM) included in the controller. In order register empty blocks having no data, also an empty block table is formed in the table memory.

Immediately after power has been turned on or immediately after resetting has been released, the controller initializes the address conversion table and the empty block table. In order to initialize the tables above, the controller performs a process for collecting logical addresses, which have been assigned to all pages in the card. The redundant region of each page stores the logical address (the conversion table address) which has been used in the previous writing operation. The most significant address portion of the logical address, that is, the logical block address is common to all pages in one block. Therefore, data stored in the redundant region of a representative page (which is a head page in general) of each block is required to be read. By extracting the included logical block address, the logical address for each of pages PG0 to PG15 in the block BLj can be detected.

In general, data in the redundant region of the head page of a first block of each of all of the flash memories is sequentially read. Then, data in the redundant region of the head page of a second block of each of all of the flash memories is sequentially read. Then, data in the redundant region of the head page of a third block is sequentially read. Then, a similar reading operation is repeated for the following blocks.

In a flash disk system of the foregoing type, when an operation for reading data from the redundant region of the head page of a N th block of one flash memory is performed at the above-mentioned timing, the controller fetches data of 16 bytes from the output port of the flash memory in the fourth phase while performing all 16 cycles. To sequentially read data from the redundant region of the head page of each of the N th blocks of all of the flash memories, the above-mentioned read cycles have been repeated by a number which is the same as the total number of the flash memories.

In a flash memory of the above-mentioned type, one reading operation includes four phases, i.e., writing (supplying) of a read command to one memory (a first phase); writing (supplying) of a read address on one memory (a second phase); reading of data from one memory (a third phase): and transference of data from the memory to the controller (a fourth phase). Among the four phases above, the third phase takes a long time which mainly shares one reading cycle.

The conventional flash disk system has the structure such that the controller makes an access to the same memory addresses of all of the flash memories in the card such that the controller repeats the reading cycle by the number which is the same as the total number of the memory chips. As a result, a considerably long time is required to complete the reading operation. As a result, the initialization takes an excessively long time, thus raising a problem in that the performance of the memory system deteriorates.

BRIEF SUMMARY OF THE INVENTION

Accordingly, an object of the present invention is to provide a memory reading method and a memory reading control apparatus capable of reading data stored in the same memory addresses of a plurality of semiconductor memories and thus improving the performance of the memory system.

According to one aspect of the present invention, there is provided a data reading method adaptable to a semiconductor memory unit connected to a host apparatus, comprising: a first step of simultaneously, through a bus, supplying the same read command to the semiconductor memories of a semiconductor unit connected to a host apparatus; a second step of simultaneously supplying the same address to the plurality of semiconductor memories through the bus after the first step has been performed; a third step of making the plural semiconductor memories to respond to the command and the address respectively supplied in the first and second steps to read data from memory regions accessed by the address within a predetermined time so as to set read data to respective output ports; and a fourth step of, through the bus, sequentially and individually fetching the read data set to the respective output ports of the plurality of semiconductor memories after the predetermined time has elapsed.

In According to another aspect of the present invention, there is provided a memory control apparatus comprising: command supply means for simultaneously supplying a read command to a plurality of semiconductor memories of a semiconductor memory unit connected to a host computer; address supply means for simultaneously supplying a desired address to the plurality of semiconductor memories through the bus; data fetching means for sequentially and individually fetching the read data set to an output port of each of the plurality of semiconductor memories after a predetermined time has elapsed, the fetching means being arranged to fetch the read data to respond to the read command and the address supplied at a predetermined timing; and chip enable control means for maintaining each of the plurality of semiconductor memories at a chip enable state during overall read operating time from start of command supply to completion of fetching of the read commands.

According to another aspect of the present invention, there is provided a memory system comprising a host apparatus generating various commands and addresses and a semiconductor memory unit detachably coupled with the host apparatus, the semiconductor memory unit comprising a plurality of semiconductor memories, and a control section connected to the semiconductor memories by a bus for controlling reading and writing of the semiconductor memories according to the commands and addresses from the host apparatus, the control section including command supply means for simultaneously supplying a read command to a plurality of semiconductor memories of a semiconductor memory unit connected to a host computer, address supply means for simultaneously supplying a desired address to the plurality of semiconductor memories through the bus, data fetching means for sequentially and individually fetching the read data set to an output port of each of the plurality of semiconductor memories after a predetermined time has elapsed, the fetching means being arranged to fetch the read data to respond to the read command and the address supplied at a predetermined timing, and chip enable control means for maintaining each of the plurality of semiconductor memories at a chip enable state during overall read operating time from start of command supply to completion of fetching of the read commands.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 10 is a block diagram showing the structure and functions for performing conversion of an address and searching of tables when an access for writing data has been made by a host computer;

FIG. 11 is a diagram showing a data shifting operation and new data writing operation which are performed when data is rewritten;

FIG. 12 is a diagram showing the procedure for performing a write cycle and a read cycle when a data rewriting process is performed; and FIG. 13 is a diagram showing the procedure for performing a write cycle and a read cycle when a data rewriting process is performed with the conventional structure.

DETAILED DESCRIPTION OF THE INVENTION

Referring to FIGS. 1 to 8, an embodiment of the present invention will now be described.

Figure 1:
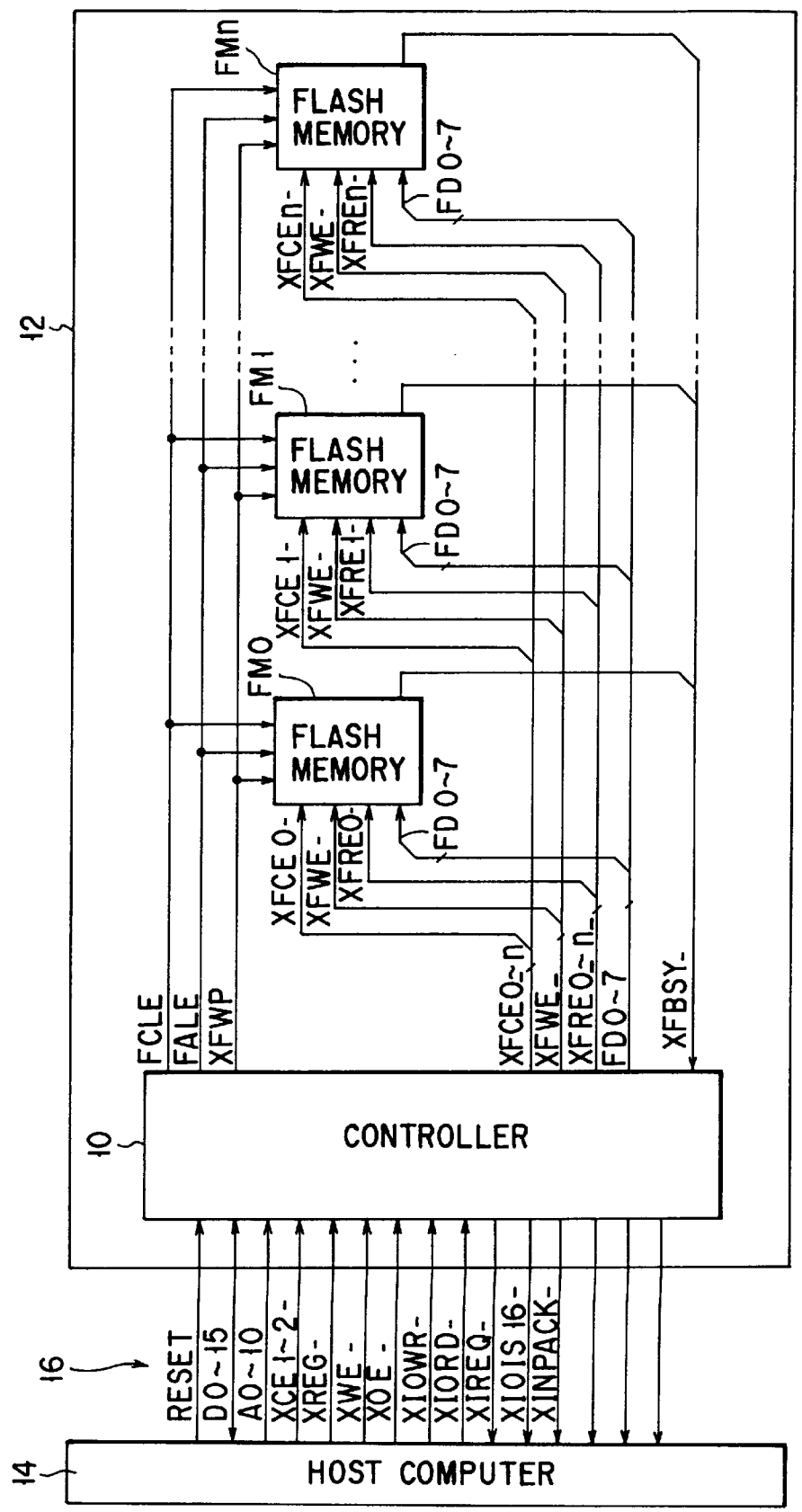
FIG. 1 is a block diagram showing the structure of a flash disk system according to an embodiment of the present invention.

A flash disk system according to this embodiment and shown in FIG. 1 has a structure such that a chip serving as a controller 10 and chips forming plural (n+1) NAND flash memories FM0 to FMn are mounted on one card (flash disk card) 12. The card 12 is connected to a card slot of the host computer 14. The controller 10 is connected to the host computer 14 through an interface having a predetermined specification, for example, a PCMCIA-ATA or IDE interface 16.

The controller 10 is, on the card 12, connected to each of the flash memories FM0 to FMn through internal buses FD0 to FD7 each having a width of 8 bits and control lines FCLE, FALE, XFWP, XFWE- and XFBSY-, which are common to all of the flash memories FM0 to FMn, and (n+1) control lines XFCE0- to XFCEn-, XFRE0- to XFREn- assigned to the corresponding flash memories FM0 to FMn.

The internal buses FD0 to FD7 are also used to transfer commands, addresses and data between the controller 10 and each of the flash memories FM0 to FMn. Among the common control lines, the control line FCLE is a command latch enable control line for causing the flash memories FM0 to FMn to identify command codes on the buses FD0 to FD7 as commands. The control line FALE is an address latch enable control line for causing the flash memories FM0 to FMn to identify the address codes on the buses FD0 to FD7 as addresses. The control line XFWP is a write protect control line for forcibly protecting writing on the flash memories FM0 to FMn. The control line XFWE- is a write enable control line for causing codes or data on the buses FD0 to FD7 to be fetched by each of the flash memories FM0 to FMn. The control line XFBSY- is a busy line with which each of the flash memories FM0 to FMn notifies the controller 10 its busy state.

Among the individual control lines, control lines XFCE0- to XFCEn- are chip enable control lines for individually or independently bringing each of the flash memories FM0 to FMn to a chip enable state (an active state). The control lines XFRE0- to XFREn- are read (output) enable control lines for individually or independently causing read data to be output from an output port of each of the flash memories FM0 to FMn onto the buses FD0 to FD7.

Figure 2:
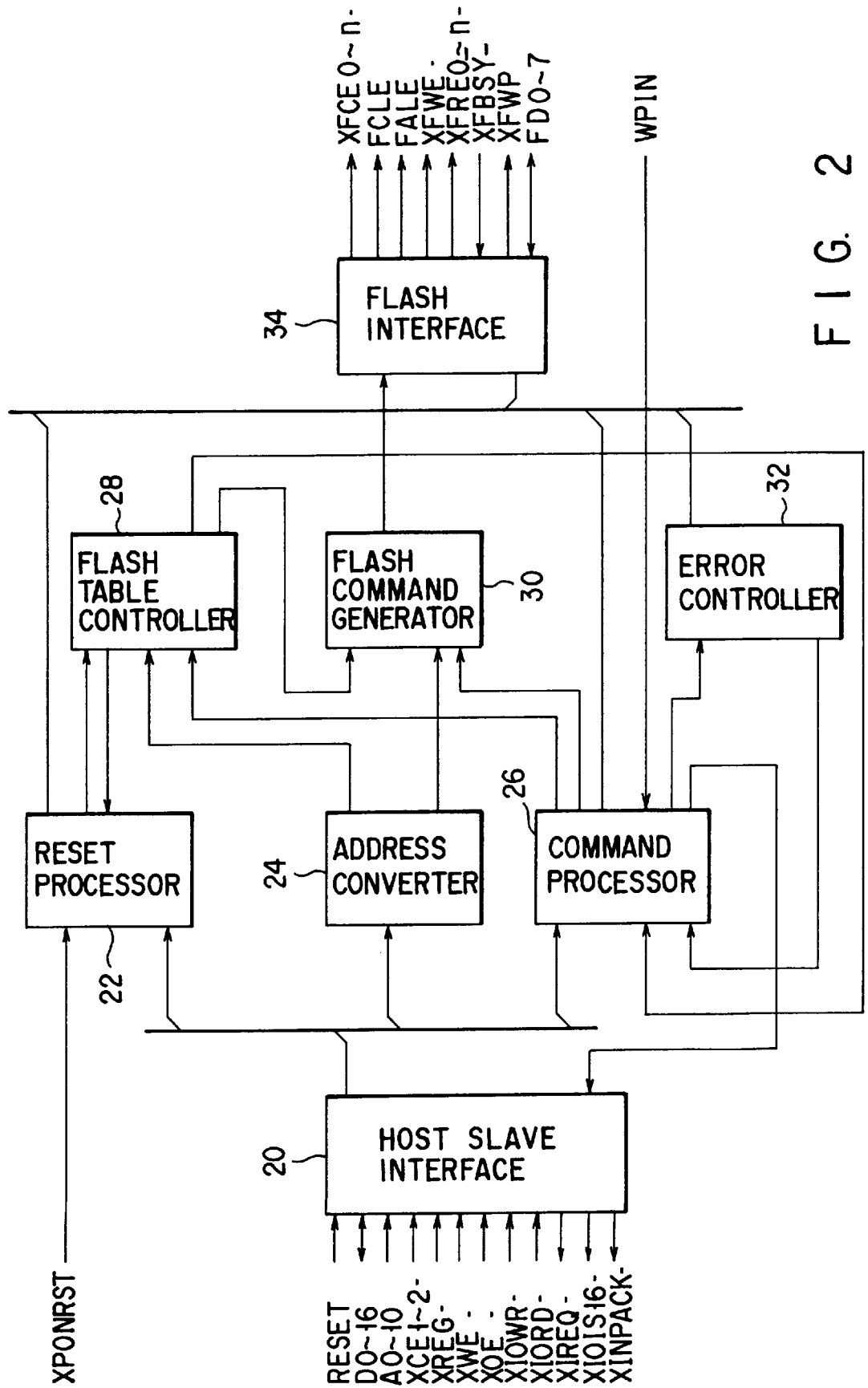
FIG. 2 is a block diagram showing the internal and functional structure of a controller according to the embodiment shown in FIG. 1.

FIG. 2 is a diagram showing the functional structure in the controller 10. As shown in FIG. 2, the controller 10 includes a host/slave interface 20, a reset processor 22, an address converter 24, a command processor 26, a flash table controller 28, a flash command generator 30, an error controller 32 and a flash interface 34.

The host/slave interface 20 includes a plurality of registers capable of directly writing/reading data to and from the host computer 14. The host/slave interface 20 is connected to the bus of the host computer 14 through an interface, for example, the PCMCIA-ATA interface of the IDE interface, having a predetermined specification.

In the above-mentioned host interface, address signals A0 to A10 and control signals XCE1 and XCE2 are used to enable the host computer 14 to select each register in the host/slave interface 20. Control signal XREG is used to select a memory space of the address map and an I/O space. Control signal XWE-/XOE- is used to write/read the memory space. Control signal XIOWR-/XIORD- is used to write/read the I/O space. The host/slave interface 20 transmits, to the host computer 14, interruption request signal XIREQ-, input acknowledge signal XINPACK- a the like. The host/slave interface 20 furthermore includes a circuit for decoding a command issued from the host computer 14.

In response to a reset signal, for example, reset signal XPONRST supplied from outside, the reset processor 22 performs a process for resetting each section in the controller 10 and a process for initializing the controller 10 after the reset state has been released.

The address converter 24 converts a logical address in a CHS (Cylinder Head Sector) mode into a logical address instructed by the host computer 14 in an LBA (Logical block address) mode in the flash disk.

The command processor 26 executes a command decoded by the host/slave interface 20 and issued from the host computer 14 by controlling the respective elements in the controller 10.

The flash table controller 28 receives a request issued from the reset processor 22 or the command processor 26 to initialize or generate an address conversion table or an empty block table. Moreover, the flash table controller 28 searches or updates the table to follow a command issued from the host computer 14. The flash table controller 28 is provided with a nonvolatile table memory comprising, for example, a SRAM. The address conversion table and the empty block table are formed on the foregoing memory.

The flash command generator 30 satisfies a request from the flash table controller 28 or the command processor 26 to generate a command code and an address signal to be supplied to the flash memories FM0 to FMn.

The error controller 32 performs an ECC (Error Checking and Correction) process which is required when writing/reading is performed.

The flash interface 34 is an input/output port through which data and signals are communicated with the flash memories FM0 to FMn through the common buses FD0 to FD7 and the various control lines (FCLE, FALE and the like). The flash interface 34 has a timing control function for, at different timings, multiplexing commands, addresses and data on the common buses FD0 to FD7.

Figure 3:
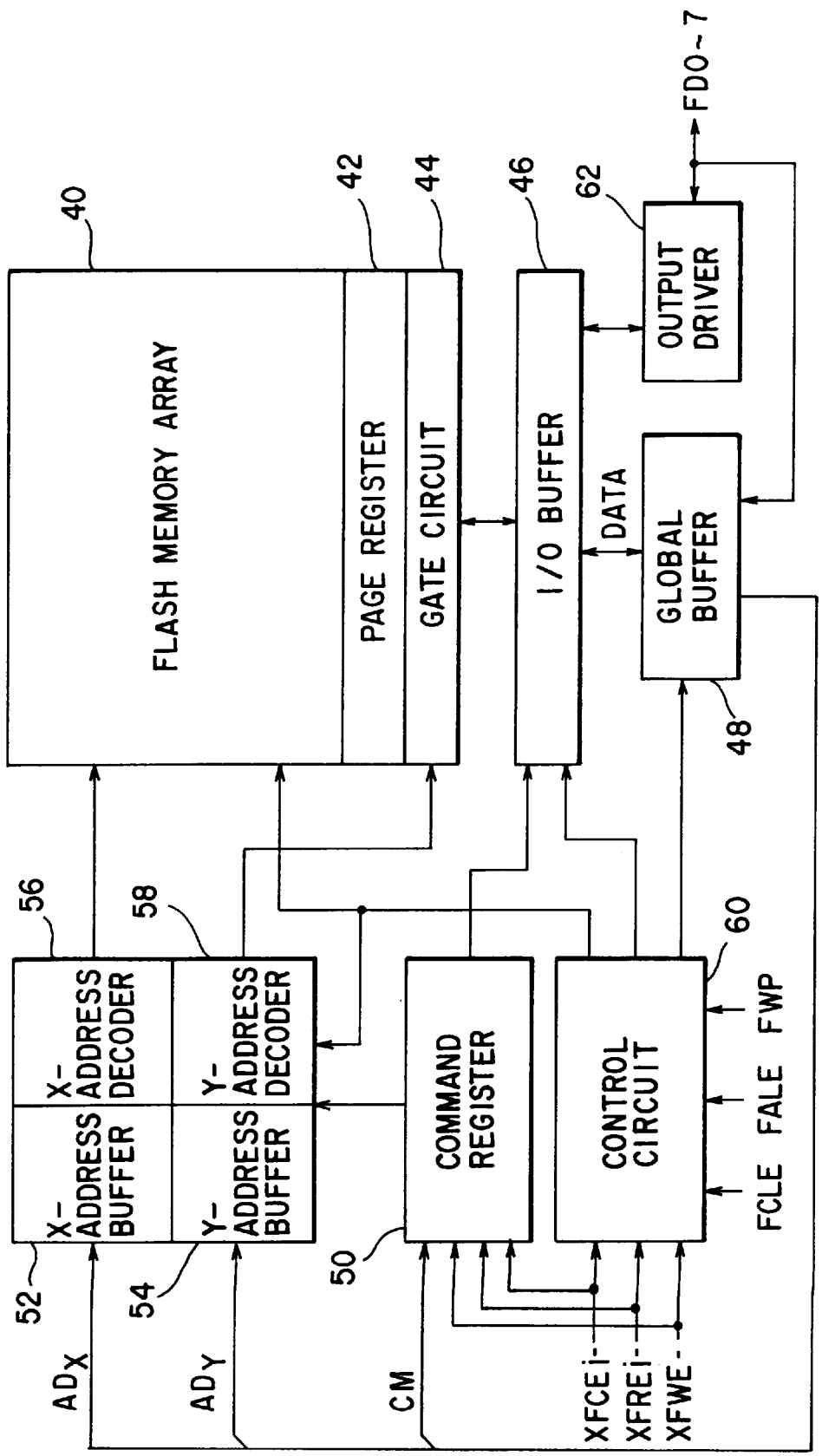
FIG. 3 is a diagram showing the internal structure of a flash memory according to the embodiment shown in FIG. 1.

Referring to FIG. 3, the internal structure of each of the flash memories FM1 (i=0 to n) will now be described.

Figure 7:
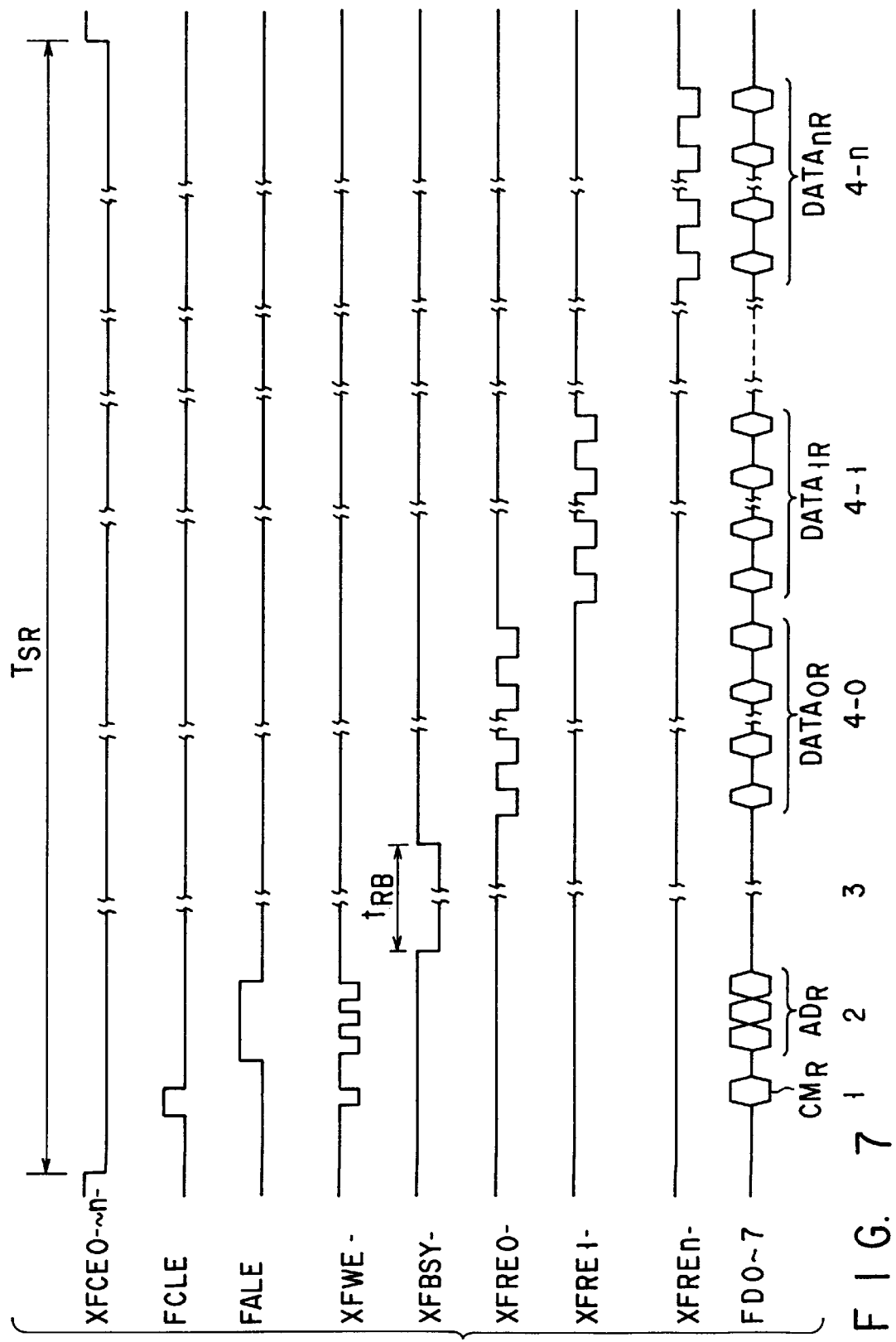
FIG. 7 is a timing chart of the operation which is performed when the controller according to the embodiment shown in FIG. 1 simultaneously reads data from the same memory regions of all of the flash memories.
Figure 8:
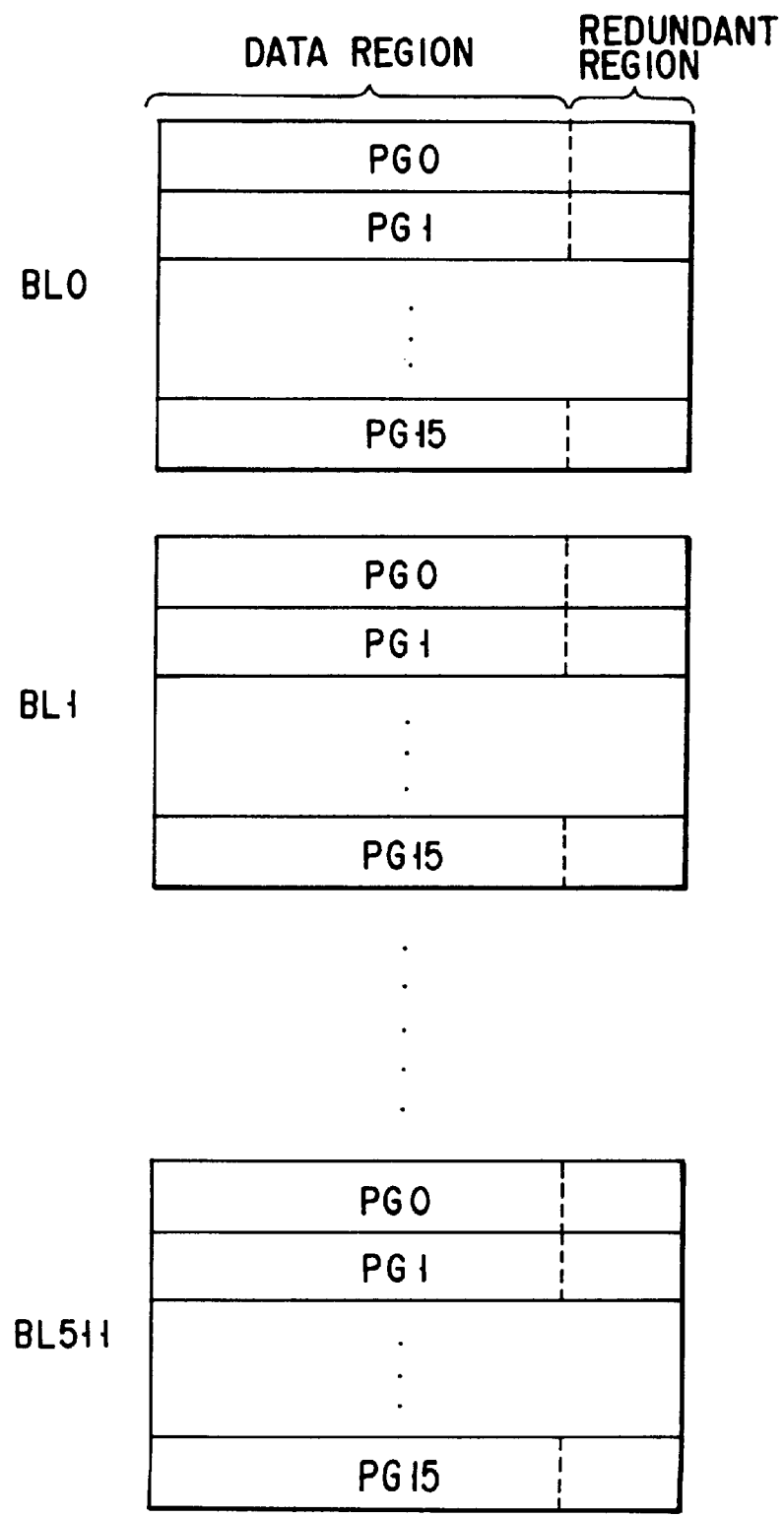
FIG. 8 is a diagram showing a sectioning format of the flash memory for use in the embodiment shown in FIG. 1.

Referring to FIG. 3, a flash memory array 40 is composed of a multiplicity of memory cells disposed in the form of a matrix. For example, when one chip of a flash memory FM1 has 512 blocks BL0 to BL511, each block BLj (j=0 to 511) is compose of 16 page PG0 to PG15 and each page PGk (k=0 to 15) is composed of 512-byte data regions and 16-byte redundant sections as shown in FIG. 7, the memory array 40 is composed of 8192, that is, (16×512) rows×528 (512+16), column, memory cells. Therefore, the array 40 has a memory capacity of 32 megabytes.

The flash memory array 40 is, through a page register 42 and a gate circuit 44, electrically connected to an I/O buffer 46 having a capacity of one page (528 bytes) to permit parallel data transference in page units to be performed between the flash memory array 40 and the I/O buffer 46. The I/O buffer 46 serves as a substantial output port of the flash memory FM1.

Commands, addresses or data on the buses FD0 to FD7 are respectively latched by a command register 50, X, Y-address buffers 52 and 54 and the I/O buffer 46 through a global buffer 48.

The command register 50 decodes a supplied command, and then controls the X, Y-address buffers 52 and 54, the address decoder 56 and 58 and the I/O buffer 46.

The X-address buffer 52 fetches row address ADX, while the X-address decoder 56 decodes the row address ADX to make active an instructed (selected) line (page) in the flash memory array 40. The Y-address buffer 54 fetches column address ADY, while the Y-address decoder 58 decodes the column address ADY to control the gate circuit 44 to transfer data on an instructed (selected) column in the flash memory array 40.

The control circuit 60 receives the control signals FCLE, FALE, NFWP, XFCEi-, XFWE- and XFREi- supplied from the controller 10 to control the respective sections in response to the supplied control signals. An output driver 62 operates a bus line when read data set to the I/O buffer 46 is transmitted onto the buses FD0 to FD7.

Figure 4A:
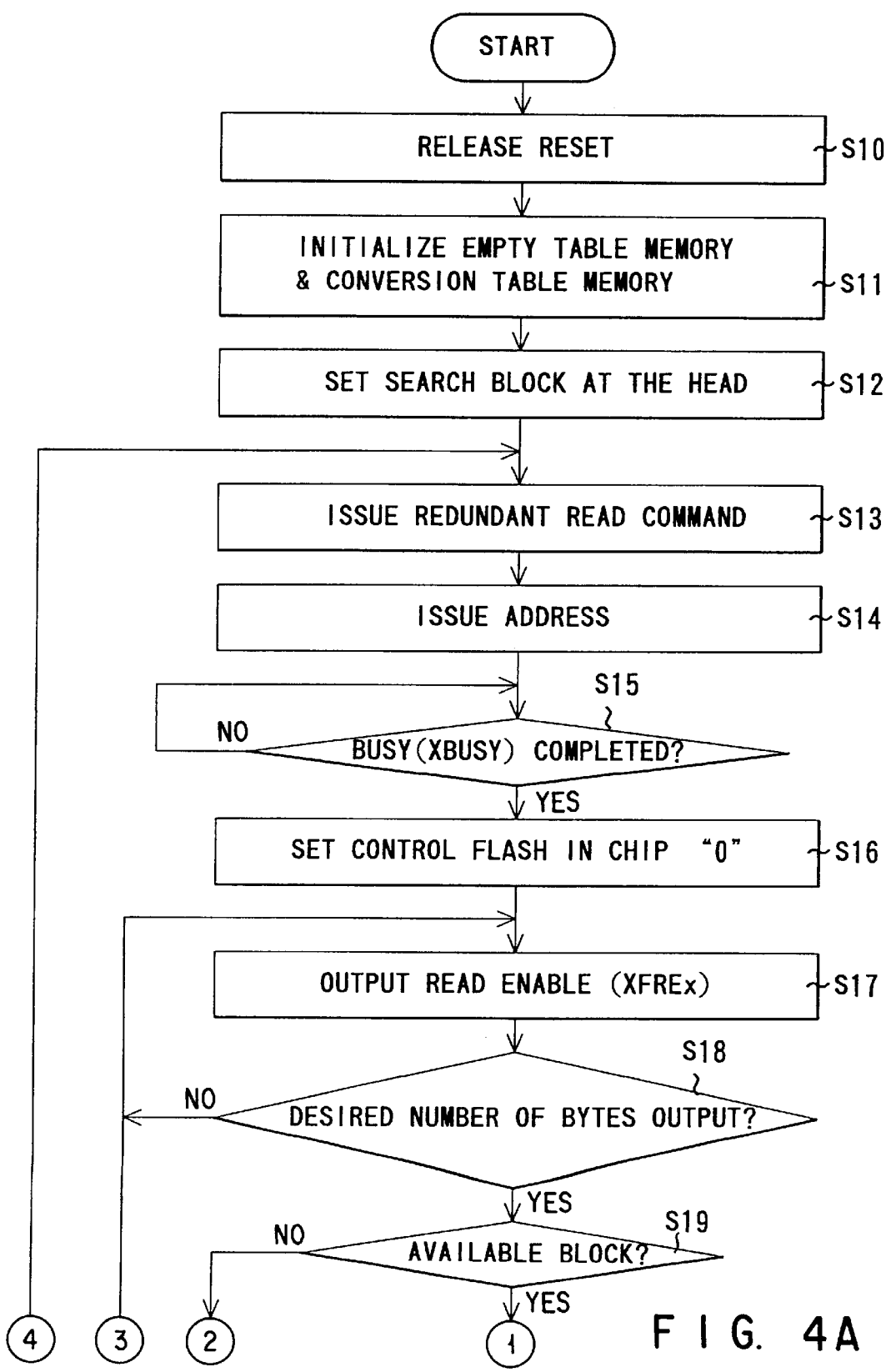
FIGS. 4A and 4B shows a flow chart for explaining a process for making a table in the system according to the embodiment shown in FIG. 1.
Figure 4B:
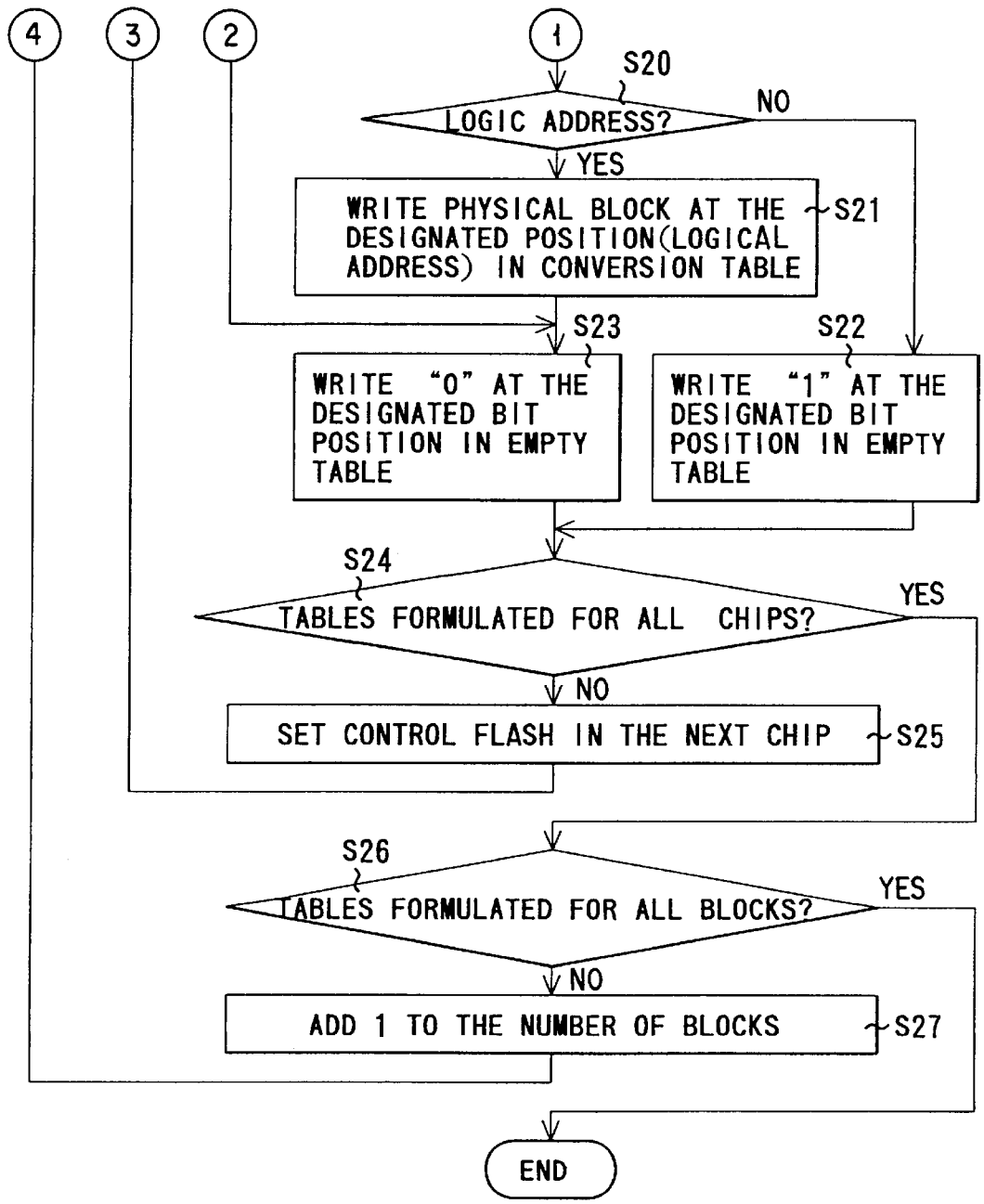

Referring to a flow chart shown in FIG. 4, the operation of the flash disk system having the above-mentioned structure will now be described.

Initially, the reset state of the system is released (S10). Then, the empty table memory is initialized, that is, the empty block table in the table memory SRAM provided for the flash table controller 28 is initialized (S11).

In step S12 a block required to be searched is set to the leading end. Then, commands for reading the redundant region and the address are sequentially issued (S13 and S14). At this time, whether or not the memory is in a busy state is determined (S14). After the busy state has been ended, control flash is set to the flash memory FM0 (S16).

Then, the read enable signal (XFREx) is transmitted (S17). At this time, the number of bytes of data in the redundant region is counted. When the number has reached a required number (S18), available blocks are determined (S19). Since all of bytes in the redundant region are not required to be read, step S18 is performed to interrupt reading when the number has reached the predetermined number. The determination of the available blocks in step S19 is performed to determine blocks because blocks include those which have been spontaneously unavailable and those which are made to be unavailable later. The determination can be performed by using a flag existing in the redundant region and indicating availability.

If an available block exists, whether or not a logical address exists is determined (S20). If a logical address exists, a physical block address is written on a subject position (the logical address) in the conversion table (S21). If no logical address exists, "1" is written on a subject bit in the empty table (S22). After step S21 has been performed, and after a negative determination has been performed in step S19, "0" is written on the subject bit of the empty table (S23).

Whether or not the above-mentioned process for generating the table has been performed for all of the chips is determined in step S24. If a negative determination is made, control flash is set to a next chip (S25) and the operation returns to step S17. If an affirmative determination is performed, whether or not the table processing process for all of the blocks has been completed is determined (S26). If a negative determination is performed, 1 is added to the present number of blocks (S27) and the operation returns to step S13. If an affirmative determination is performed, the process is ended.

Figure 5:
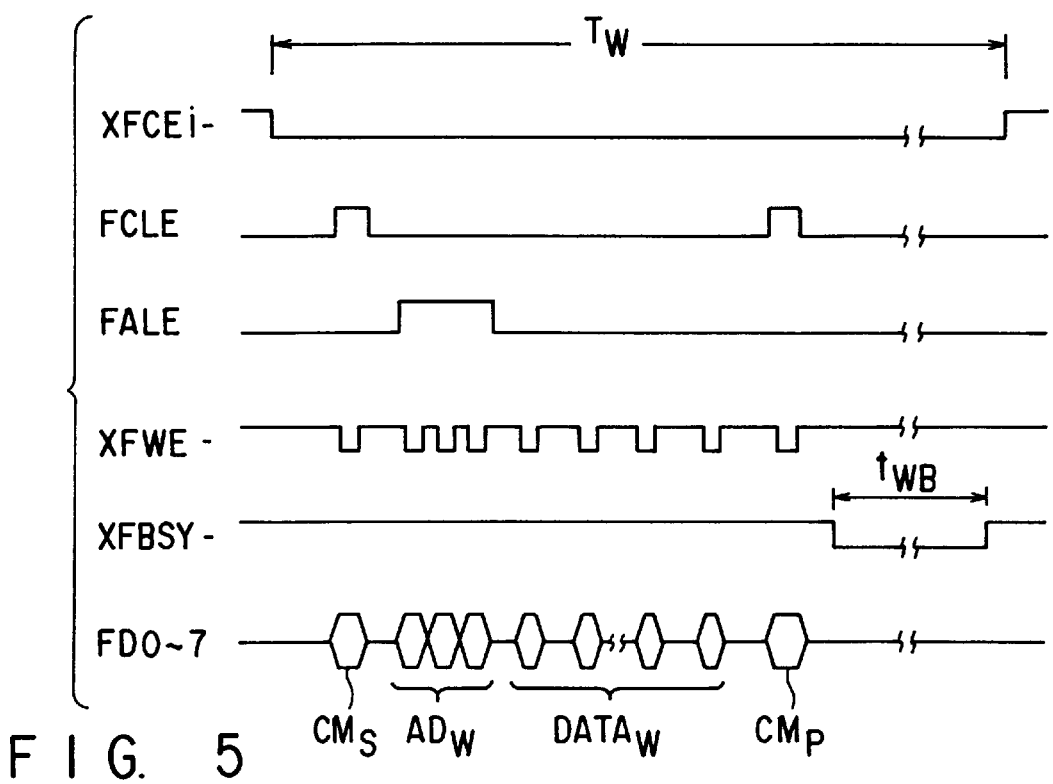
FIG. 5 is a timing chart of the operation which is performed when the controller according to the embodiment shown in FIG. 1 writes data on each flash memory.

Referring to a timing chart shown in FIG. 5, the above-mentioned table generating process will be described furthermore in detail.

In this embodiment, an operation which is performed when the controller 10 writes data on each flash memory FM1 will now be described. Note that writing of data on the flash memory FM1 is generally performed for page units.

The controller 10 remains the enable control signal XFCEi to an active state (L level) during the overall period of writing cycle TW to maintain the flash memory FM1 at a chip enable (active) state.

Initially, the controller 10 makes active (H level) command latch enable control signal FCLE to transmit data input command CMS having a predetermined code onto the buses FD0 to FD7 and makes active (L level) write enable control signal XFWE-. In response to the command writing operation performed by the controller 10, the flash memory FM1 fetches the data input command CMS on the buses FD0 to FD7 to latch the same into the command register 50.

Then, the controller 10 responds to makes active (H level) the address latch enable control signal FALE and divides the write address ADW having a predetermined number of bits into three sections to transmit the same onto the buses FD0 to FD7. Whenever the transmission is performed, the controller 10 makes active (L level) the write enable control signal XFWE-.

In response to the address writing operation performed by the controller 10, the flash memory FM1 fetches the write address ADW on the buses FD0 to FD7 to latch the same to the address buffers 52 and 54. The write address ADW is a memory address in the flash memory FMi on which writing is performed or an address (the head address) which indicates a position in the region at which writing starts.

Then, the controller 10 makes the command latch enable control signal FCLE and the address latch enable control signal FALE to be deactivated (L level). In this state, the controller 10 transmits write data DATAW by one byte at a time onto the buses FD0 to FD7. Whenever the controller 10 transmits the write data DATAW, the controller 10 makes active the write enable control signal XFWE-. The flash memory FM1 responds to the write enable control signal XFWE- to fetch data DATAW on the buses FD0 to FD7 by one byte at a time to store the same in the I/O buffer 46.

Then, the controller 10 again makes active (H level) the command latch enable control signal FCLE to transmit the program command CMP having a predetermined code onto the buses FD0 to FD7 and makes active (L level) the write enable control signal XFWE-. In response to the command writing operation performed by the controller 10, the flash memory FM1 fetches the program command CMP on the buses FD0 to FD7 to latch the same to the command register 50 so as to start performing the programming operation.

That is, the flash memory FM1 decodes the program command CMP to write, on the storage address or storage region in the flash memory array 40 instructed with the write address ADW, write data DATAW fetched by the I/O buffer 46. Since the operation for writing data into the memory takes a predetermined time tWB, the flash memory FM1 maintains the busy signal XFBSY- at an active (L level) level during the processing period tWB. When the operation for writing data on the memory has been completed, the busy signal XFBSY is returned to the deactivated level (H level). Thus, one operation for writing data on the flash memory FM1 is completed.

Figure 6:
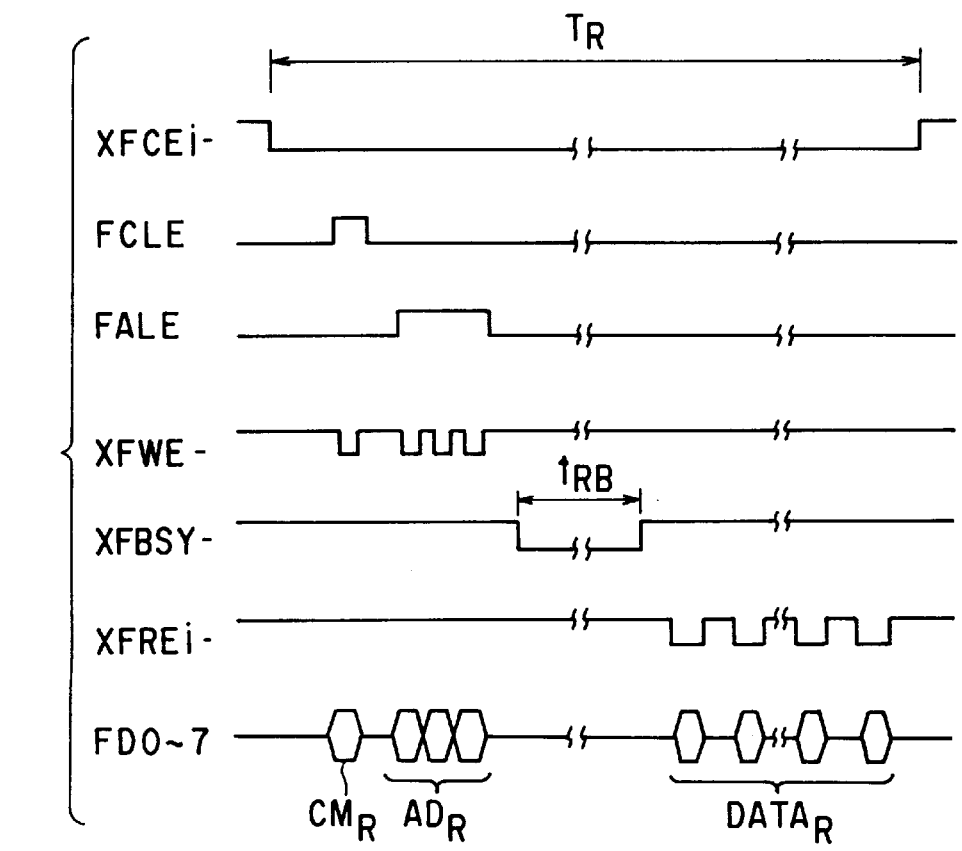
FIG. 6 is a timing chart of the operation which is performed when the controller according to the embodiment shown in FIG. 1 reads data from each flash memory.

Referring to a timing chart shown in FIG. 6, a usual operation for this embodiment which is performed when the controller 10 reads data from an arbitrary memory address in each flash memory FM1 will now be described.

The usual reading operation is performed in a manner substantially the same as the reading operation which is performed by a conventional flash disk system. That is, the flash memory FMi decodes supplied read command CMR and read address ADR to read data from a memory address or a region instructed with the read address ADR so as to set read data above to a predetermined output port or a buffer. Since the operation for reading data from the memory takes time for a predetermined length, the flash memory FMi maintains the busy signal XFBSY- for the processing time tRB at an active (L level) level to standby the controller 10.

After the reading operation of the flash memory Fmi has been completed and therefore the busy state has been suspended, the controller 10 starts performing an operation for fetching read data from the output port of the flash memory.

In general, data is, as a certain group, written/read to and from a flash memory. The read address notified from the controller 10 to the flash memory to read data is the memory address, which is the read data source, or the address (the head address) for instructing the position of a region at which reading starts. Thus, the controller 10 repeatedly makes active (L level) the read enable control signal to fetch data by one byte at a time from the output port of the flash memory through the bus so as to read data in a group from a required memory region in a flash memory instructed with the read address.

The conventional system comprises one common read (output) enable control signal (a control line) XFRE- is used to all of the flash memories FM0 to FMn. However, the system according to this embodiment has a plurality of read (output) enable control signal (a control line) XFRE0-XFREn respectively assigned to flash memories FM1.

Then, an operation for the controller 10 of the flash disk system according to this embodiment to simultaneously read data from the same memory addresses (the redundant region) of all of the flash memories FM0 to FMn will now be described, the operation being performed in order to initialize the address conversion table and the empty block table.

In the flash disk system according to this embodiment, the address conversion table and the empty block table are initialized in the controller 10 immediately after electric power has been supplied or immediately after resetting has been released. To initialize the foregoing tables, the controller 10 reads data (in which a field of "conversion table address" exists) registered or stored in the redundant region of the leading page PG0 of each of the blocks BL0 to BL511 in all of the flash memories FM0 to FMn.

In order to perform the above-mentioned reading operation, data in the redundant region of the leading page PG0 of the first block BL0 of each of all of the flash memories FM0 to FMn is sequentially read. Then, data in the redundant region of the leading page PG0 of the second block BL1 of each of all of the flash memories FM0 to FMn is sequentially read. Then, data in the redundant region of the leading page PG0 of the third block BL2 of each of all of the flash memories FM0 to FMn is sequentially read. Then, a similar reading operation for the following blocks BL3, BL4, . . . , is repeated.

Referring to a timing chart shown in FIG. 7, an operation of the controller 10 of the system according to this embodiment to simultaneously read data from the redundant region of the leading page PG0 of a (j+1) th block BLj, which is an arbitrary block, in L the flash memories FM0 to FMn will now be described.

During the overall period R in the simultaneous reading cycle TSR, the controller 10 maintains all of chip enable control signals XFCE0- to XFCEn- at an active (L level) level to maintain all of the flash memories FM0 to FMn at a chip enable state.

Initially, the controller 10 makes active (H level) the command latch enable control signal FCLE to transmit a read command CMR having a predetermined code onto the buses FD0 to FD7. Simultaneously, the controller 10 makes active (L level) the write enable control signal XFWE-. In response to the command writing operation performed by the controller 10, all of the flash memories FM0 to FMn simultaneously fetch the read command CMR to latch the same to each of the command registers 50.

Then, the controller 10 makes active (H level) the address latch enable control signal FALE to transmit read address ADR having a predetermined number of bits while dividing the operation into three portions. Whenever the controller 10 performs the transmission, the controller 10 makes active (L level) the write enable control signal XFWE-. The read address ADR is a memory address, which is the read data source, or the address (the head address) for instructing the position of a region at which reading starts. That is, the read address ADR is the address for instructing the head position of the redundant region of the leading page PG0 of the (j+1) block BLj in each of the flash memories FM0 to FMn.

In response to the address writing operation performed by the controller 10, all of the flash memories FM0 to FMn simultaneously fetch the read address ADR from the buses FD0 to FD7 to simultaneously start reading the memories.

That is, all of the flash memories FM0 to FMn decode the supplied read command CMR and read address ADR to read data DATA0R to DATAnR for 16 bytes from the memory region (the page redundant region) in the flash memory array 40 instructed with the read address ADR so as to transfer (set) read data DATA0R to DATAnR to the I/O buffer 46. Since the operation for reading the memory takes a predetermined time tRB, each of the flash memories FM0 to FMn maintains the busy signal XFBSY- at an active level (L level) during the processing time tRB.

When the operations for reading all of the flash memories FM0 to FMn have been completed at substantially the same time and the busy states have simultaneously been suspended (when XFBSY- has been returned to the H level), the controller 10 starts fetching or recovering read data DATA0R-DATAnR set to the I/O buffer 46 of each of the flash memories FM0 to FMn.

The recovery of read data above is performed as follows: initially only the read (output) enable control signal XFRE0- assigned to the first flash memory FM0 is repeatedly made active (L level) 16 times at predetermined cycles so that read data 0R is, by one byte at a time (16 bytes in all), fetched from the I/O buffer 46 of the first flash memory FM0 through the buses FD0 to FD7.

Then, only the read (output) enable control signal XFRE1- assigned to the second flash memory FM1 is repeatedly made active (L level) 16 times at predetermined cycles so that read data 1R is, by one byte at a time (16 bytes in all), fetched from the I/O buffer 46 of the second flash memory FM1 through the buses FD0 to FD7.

A similar operation is repeated for the following flash memories FM2, FM3, . . . , and then only the read (output) enable control signal XFREn- for the (n+1) th flash memory FMn is repeatedly made active 16 times at predetermined cycles so that read data DATAnR is fetched from the I/O buffer 46 of the flash memory FMn through the buses FD0 to FD7 by one byte at a time (16 bytes at a time). Note that the order for fetching read data DATA0R-DATAnR in the flash memories FM0 to FMn into the controller 10 can arbitrarily be determined.

As described above, data can simultaneously be read from the redundant region of the leading page PG0 of the (j+1) block BLj, which is an arbitrary block in all of the flash memories FM0 to FMn, in one reading cycle TSR.

When the address conversion table and the empty block table are initialized, the read address ADR is successively updated to repeat the foregoing read cycle TSR by a predetermined times (the number of time which is the same as the total number of blocks in one memory and which is 512 in this embodiment). As a practical matter, not only the leading page PG0 of each block BLj but also data in the redundant region on the final page PG15 are sometimes read in order to confirm and inspect the inside portion of the block. Therefore, the read cycle TSR is repeated two times (1024 times) in the foregoing case.

In the flash disk system according to this embodiment, the read cycle TSR for simultaneously reading data from the same memory addresses or the regions in all of the flash memories FM0 to FMn consists of the following phases (1) writing (supply) of the read command onto all of the memories FM0 to FMn, (2) writing (supply) of the read address onto all of the memories FM0 to FMn, (3) reading of data from all of the memories FM0 to FMn and (4)-0 to (4)-n sequential (alternative) transference (fetching) of read data from each of the memories FM0 to FMn to the controller 10. The first to third phases are commonly (simultaneously) performed for all of the memories FM0 to FMn.

Assuming that time required to perform the common (simultaneous) phases (1), (2) and (3) is TF, time can be shortened (saved) by about TFXn as compared with the conventional system, where n is a number obtained by subtracting one from the total number (n+1) of the memories FM0 to FMn. Since the required time TF (in particular, the time required to perform the phase (3)) is relatively long and about 10 (chips of) flash memories are connected to one controller in a general flash disk system, a significant effect of shortening the time can be obtained from this embodiment. When the address conversion table and the empty block table are initialized, the read cycle TSR is repeated by a multiplicity of times (512 times of 1024 times). Therefore, time required to perform the initialization can significantly be shortened and, therefore, the performance of the system can satisfactorily be improved.

The above-mentioned structure of the flash disk system, and in particular the internal structure of the flash memory FM1 and that of the controller 10 are examples. Therefore, the present invention may be widely employed to an arbitrary memory system having a structure in which a plurality of flash memory are connected to one controller or a CPU through a common bus. Moreover, the present invention may be applied to another semiconductor memory of a type performing a reading operation similar to that of the flash memory.

As described above, the memory reading method or the memory control apparatus according to the present invention have the structure such that the controller reads data stored in the same memory addresses or the regions of a plurality of the semiconductor memories through a common bus in such a manner that the operation of supplying the read command and the read address or reading data in the memories is performed commonly (simultaneously) for all of the memories. Moreover, only fetching of read data is sequentially and individually performed for each memory. Therefore, the overall read time can significantly be shortened and the performance of the memory system can considerably be improved.

Referring to a timing chart shown in FIG. 9, an operation will now be described which is performed when a reading cycle for reading data for one page from another flash memory (for example, FM0) is performed during execution of a writing cycle in which data for one page is written on a certain flash memory (for example, FM1) of the flash disk system according to this embodiment.

The controller 10 maintains the chip enable control signal XFCEI- at an active level (L level) during the overall period of the write cycle TW for the flash memory FM1 to maintain the flash memory FM1 at a chip enable (active) state.

Initially, the controller 10 makes active (H level) the command latch enable control signal FCLE to transmit data input command CMS having a predetermined code onto the buses FD0 to FD7. Moreover, the controller 10 makes active (L level) the write enable control signal XFWE-. In response to the command writing operation performed by the controller 10, the flash memory FM1 fetches the data input command CMS on the buses FD0 to FD7 to latch the same to the own command register 50.

Then, the controller 10 makes active (H level) the address latch enable control signal FALE to transmit the write address ADW having a predetermined number of bits onto the buses FD0 to FD7 by dividing the operation into plural times (three times in this embodiment). Whenever the controller 10 transmits write address ADW, the controller 10 makes active (L level) the write enable control signal XFWE-. In response to the address writing operation performed by the controller 10, the flash memory FM1 fetches the write address ADW on the buses FD0 to FD7 to latch the same to the own X-, Y-address buffers 52 and 54. The write address ADW indicates the page in the flash memory FM1 to which data is written.

Then, the controller 10 makes each of the command latch enable control signal FCLE and the address latch enable control signal FALE- to be deactivated (L level). In this state, the controller 10 transmits write data DATAW for one page (528 bytes) onto the buses FD0 to FD7 by one byte at a time. Whenever the controller 10 transmits one byte of write data DATAW, the controller 10 makes active (L level) the write enable control signal XFWE-. In response to the write enable control signal XFWE-, the flash memory FM1 fetches write data DATAW on the buses FD0 to FD7 by one byte at a time to store the same in the I/O buffer 46.

Then, the controller 10 again makes active (H level) the command latch enable control signal FCLE to transmit the program command CMP having a predetermined code onto the buses FD0 to FD7. Simultaneously, the controller 10 makes active (L level) the write enable control signal XFWE-. In response to the command writing operation performed by the controller 10, the flash memory FM1 fetches the program command CMP on the buses FD0 to FD7 to latch the same to the command register 50 so that the flash memory FM1 starts performing the programming operation.

That is, the flash memory FM1 decodes the program command CMP to write data DATAW for one page (528 bytes) stored in the I/O buffer 46 on a memory region (a page) in the flash memory array 40 instructed with the write address ADW. The operation for writing data on the memory takes predetermined time tWB which is about 300 ms. The flash memory FM1 starts performing the data writing operation, and then makes active (L level) the busy signal XFBSY-. The flash memory FM1 remains the busy state until the data writing operation is completed (until the predetermined time tWB has elapsed).

In response to the operation of the flash memory FM1 to make active (L level) the busy signal XFBSY-, the controller 10 starts the read cycle TR in the flash memory FM0. To start the read cycle TR, the controller 10 makes active (L level) the chip enable control signal XFCE0- to maintain the flash memory FM0 at a chip enable (active) state.

Initially, the controller 10 makes active (H level) the command latch enable control signal FCLE to transmit the read command CMR having a predetermined code onto the buses FD0 to FD7. Simultaneously, the controller 10 makes active (L level) the write enable control signal XFWE-. In response to the command writing operation performed by the controller 10, the flash memory FM0 fetches the read command CMR from the buses FD0 to FD7 to latch the same to the own command register 50.

Then, the controller 10 makes active (H level) the address latch enable control signal PALE to transmit the read address ADR having a predetermined number of bits onto the buses FD0 to FD7, the transmission being performed simultaneously or by dividing the operation into plural times (three times in this embodiment). Whenever the controller 10 transmits the read address ADR, the controller 10 makes active (L level) the write enable control signal XFWE-. The read address ADR indicates the page in the flash memory FM0 which is the data reading source.

In response to the address writing operation performed by the controller 10, the flash memory FM0 fetches the read address ADR on the buses FD0 to FD7 to start performing the data reading operation in the memory.

That is, the flash memory FM0 decodes the supplied read command CMR and the read address ADR to read data DATAR for one page (528 bytes) from the memory region (the page) in the flash memory array 40 instructed with the read address ADR to transfer (set) read data DATAR above to the I/O buffer 46. Since the memory reading operation takes a predetermined time of tRB which is, for example, about 25 ms, the flash memory FM0 maintains the busy signal XFBSY0- at an active level (L level) during the processing time tRB.

After the operation for reading the flash memory FM0 has been completed and thus the busy state has been suspended (that is, after the busy signal XFBSY0- has been returned to the H level), the controller 10 starts fetching read data DATAR set in the I/O buffer 46 of the flash memory FM0. That is, the controller 10 repeatedly makes active (L level) the read (output) enable control signal XFRE0- at predetermined cycles (528 times) so as to fetch read data DATAR for one page (528 bytes) from the I/O buffer 46 of the flash memory FM0 by one byte at a time through the buses FD0 to FD7.

During the read cycle TR for the flash memory FM0, the flash memory FM1 does not receive any signal supplied from outside because data is being written on the flash memory FM1 (the busy state). Therefore, the read cycle TR can be performed between the controller 10 and the flash memory FM0 independently from the flash memory FM1.

The other flash memories FM2 to FMn are substantially remained to be separated from the buses FD0 to FD7 because each of the chip enable control signals XFCE2- to XFCEn- is remained to the disable state (H level). Therefore, the write cycle TW for the flash memory FM1 and the read cycle TR for the flash memory FM0 are not affected by the other flash memories FM2 to FMn.

After the read cycle TR in each flash memory FM0 has been completed and the busy time tWB for data writing in the flash memory FM1 has been completed, the controller 10 confirms that the busy signal XFBSYI- has been returned to the deactivated state (H level). Then, the controller 10 inspects the validity of the current operation for writing data (programming) on the flash memory FM1 whether the operation has been confirmed as required.

In order to inspect the validity of results of the programming operation, the controller 10 makes active (H level) the command latch enable control signal FCLE to transmit the status register read command CMC having a predetermined code onto the buses FD0 to FD7. Simultaneously, the controller 10 makes active (L level) the write enable control signal XFWE-.

In response to the command writing operation performed by the controller 10, the flash memory FM1 fetches the status register read command CMC from the buses FD0 to FD7 to decode the status register read command CMC so as to respond to the status register read command CMC. That is, the flash memory FM1, through the I/O buffer 46, transmits, to the buses FD0 to FD7, write status bit I/O0 set to a status register in the command register 50 in the flash memory FM1. The controller 10 receives the write status bit I/O0 from the flash memory FM1 to determine whether or not the current data writing operation (programming) in the write cycle TW has been performed as desired in accordance with the contents of the bits.

As described above, the flash disk system according to this embodiment has the structure such that: while writing write data DATAW for one page on an arbitrary flash memory (for example, flash memory FM1), the controller 10 uses the period tWB, in which the flash memory FM1 is busy because of the data writing operation therein, to make a reading access to another arbitrary flash memory (for example, flash memory FM0) during the period tWB so that read data DATAR for one page is read from the flash memory FM0.

Note that the write busy time tWB or the read busy time tRB in each memory flash memory FM1 which takes when data is written or read in a quantity smaller than one page (528 bytes) is substantially the same as that which takes when data in a quantity of one page is written or read. The difference is that time required to serially transfer write or read data between the controller 10 and each flash memory FM1 is shortened in proportion to the quantity of data. Since the period of the serial transference is, for example, about 27 ns/1 byte, the difference in the quantity of data or the serial transference time does not considerably affect the overall write cycle TW or the read cycle TR.

Referring to FIGS. 10 to 12, a process for rewriting data which is performed in the flash disk system according to this embodiment will now be described. According to this embodiment, a parallel process can be performed in which writing of data on the arbitrary flash memory FM1 and reading of data from an arbitrary flash memory FMe can be performed during a data rewriting process.

The flash disk system according to this embodiment has the structure such that the flash table controller 28 of the controller 10 reads data stored in the redundant region of the leading page PG0 of each of all of blocks BL0 to BL511 in the flash memories FM0 to FMn after electric power has been supplied or after resetting has been released. Moreover, the flash table controller 28 initializes the address conversion table and the empty block table for each of the flash memories FM0 to FMn in accordance with the "conversion table address" contained in redundant data above.

The address conversion table is a table for making, for each of the flash memories FM0 to FMn, correspond, to each other, the physical address of the block, in which data is being written, and the logical address in the LBA (Logical block address) mode instructed by the host computer 14 when data above is written. The empty block table is a table to which one or a plurality of empty blocks BL in which no data has been written is registered for each of the flash memories FM0 to FMn. Physical block address or a pointer for instructing an empty block which must be first used among the above-mentioned empty blocks is always set.

Referring to FIG. 10, data is written to the flash disk system according to this embodiment such that the host computer 14 supplies logical address [AD] CHS in a CHS (Cylinder Head Sector) mode to the controller 10. The logical address [AD] CHS supplied from the host computer 14 is converted into logical address [AD] LBA in the LBA (Logical block address) mode in the address converter 24 in the controller 10. The logical address [AD] LBA in the LBA mode is, in the controller 10, supplied to the flash table controller 28.

The flash table controller 28 divides the logical address [AD] LBA into the most significant address portion for instructing one specific block BLj, that is, logical block address [AD] LBA, BLj and a lower address portion for instructing one specific page PGj, that is, logic page address [AD] LBA, PGk. The flash table controller 28 makes a reference or searches an address conversion table 28A. If physical block address <AD> PH, BLj corresponding to the logical block address [AD] LBA, BLj has been registered in the table 28A, the flash table controller 28 issues (outputs) the physical block address <AD> Ph, BLj.

Since the logical block address [AD] LBA, BLj is a logical address in the LBA (Logical block address) mode, the lower address portion, that is, the logic page address [AD] LBA, PGk can be used as the page address of the physical address as it is. Therefore, synthesis of the logic page address [AD] LBA, PGk and the physical block address <AD> PH, BLj enables physical address <AD> PH for instructing the page on which data is written at this time to be obtained.

However, since certain data has been written on the page PGk in the block BLj instructed with the physical address <AD> PH, overwriting of data cannot be performed because of the characteristic of the flash memory. Therefore, new data must be written on another empty block. Therefore, data stored in other pages (PG0 to PGk-1, PGk+1 to PG15) in the foregoing block BLJ must be shifted to the same empty block for the new data item. Usually, an empty block existing in an adjacent flash memory is used as the destination (a new block) of data rewriting.

Accordingly, the flash table controller 28 issues physical block address <AD> PH, BLj in the flash memory FM0 instructed at the current data writing operation and simultaneously searches the empty block table 28B relating to the adjacent flash memory FM1 so as to issue physical block address <AD> PH, BLh for instructing one empty block BLh in the foregoing flash memory FM1. The physical block address <AD> PH, BLh and the foregoing lower address portion (the logic page address) [AD] LBA, PGk are synthesized with each other so that physical address <AD> PH' for instructing page PGk which is the subject of rewriting in the empty block BLh in the flash memory FM1 is obtained.

As described above, the block BLJ in the flash memory FM0 to which the logical address instructed by the host computer 14 for writing data has been assigned is detected so that the empty block BLh in the flash memory FM0 for rewriting data is determined.

Then, the controller 10, as shown in FIG. 11, performs a data shifting operation in which it starts sequential reading of data at leading page PG0 of the block BLj in the flash memory FM0 by one page at a time (note that page PGk which is the subject of rewriting is excluded) and then writes read data on each corresponding page in the empty block BLh in the flash memory FM1. As for the page PGk which is the subject of rewriting, former data is not read from the subject page PGk of the block BLj in the flash memory FM0. As an alternative to this, write data (new data) from the host computer 14 is written on the subject page PGk of the empty block BLh in the flash memory FM1.

The above-mentioned sequential data shifting operation and new data writing operation are, in the controller 10, performed by the flash command generator 30 and the flash interface 34 under control of the command processor 26. The flash interface 34 is provided with a buffer 34A for temporarily saving data for one page read from the (former) block BLj, which is the source of data to be shifted, until data above is written on the (new) block BLh, which is the destination of shifting; and a buffer 34B for temporarily saving write data supplied from the host computer 14 until (new) write data above is written on the new block BLh.

FIG. 13 shows a time chart of a data writing process which is performed in the flash disk system according to this embodiment.

Initially, the read cycle TR for reading data for one page from the leading page PG0 of the block BLj is performed in the flash memory FM0. The read cycle TR is performed in accordance with the same sequence as that of the read cycle TR which is performed in the flash memory FM0 and which is shown in FIG. 9 such that the same time is taken. As a result of the read cycle TR, data DATAPG0 for one page read from the leading page PG0 of the block BLj of the flash memory FM0 is temporarily saved in the buffer 34A in the flash interface 34.

Immediately after the read cycle TR has been completed in the flash memory FM0, the write cycle TW is started in which data DATAPG0 for one page saved (read from the leading page PG0 of the block BLj of the flash memory FM0 in the previous read cycle TR) in the buffer 34A is written on the leading page PG0 of the empty block BLh of the flash memory FM1. The write cycle TW is performed in accordance with the same sequence as that of the write cycle TW in the flash memory FM1 such that the substantially the same time is taken.

Figure 9:
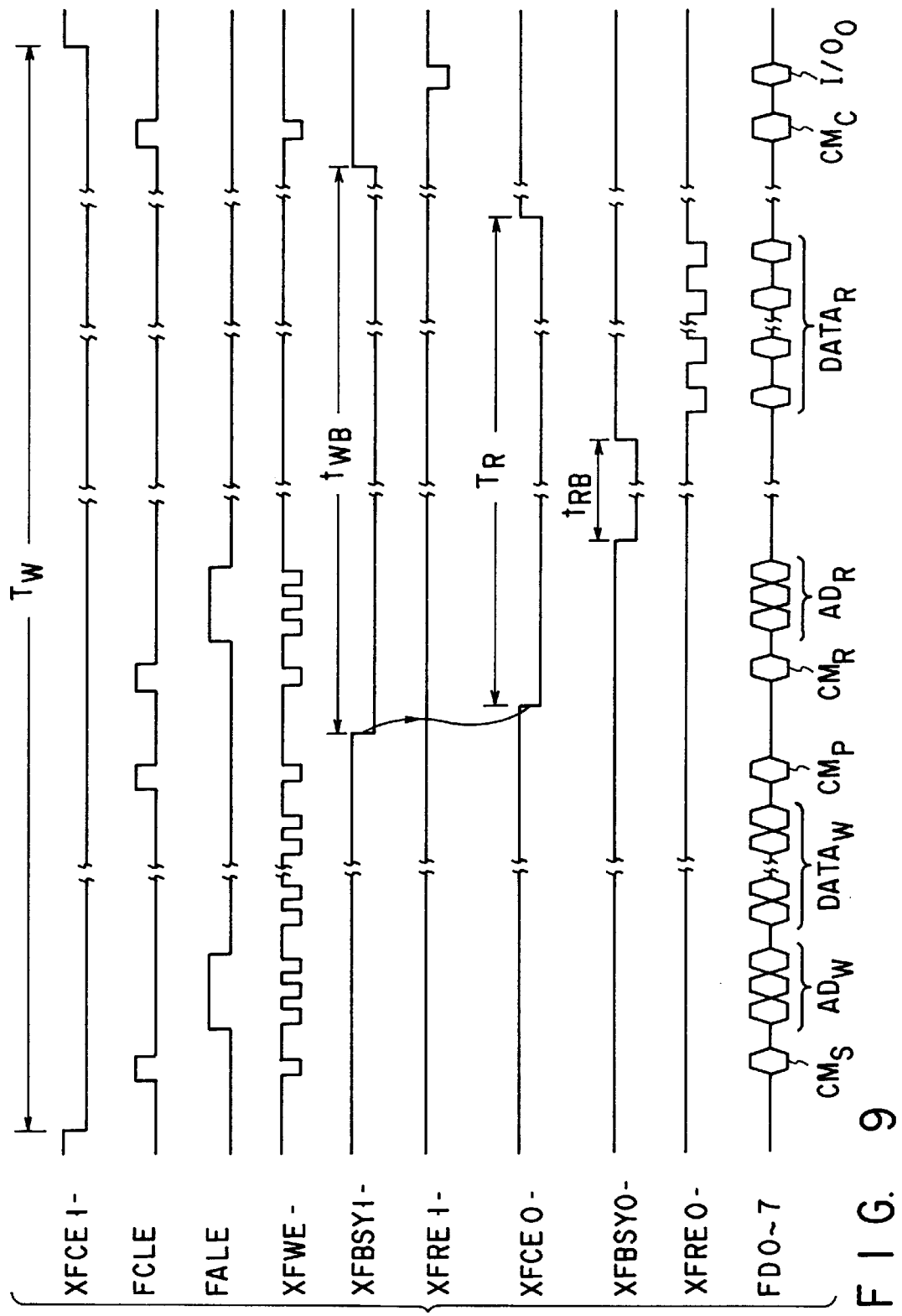
FIG. 9 is a timing chart for explaining a simultaneous writing/reading operation or a parallel writing/reading operation of a plurality of flash memories in the flash disk system shown in FIG. 1.

In this embodiment, the read cycle TR is performed simultaneously with or in parallel to the write cycle TW in the flash memory FM1 at substantially the same timing as that shown in FIG. 9, the read cycle TR being performed such that data DATAPG1 for one page is read from the second page PG1 of the block BLj in the flash memory FM0. Data DATAPG1 for one page read from the page PG1 of the block BLi in the read cycle TR is as well as temporarily saved in the buffer 34A in the flash interface 34.

As a result, when the write cycle TW in which data DATAPG0 for one page is written on the leading page PG0 of the empty block BLh in the flash memory FM1 has been completed, data DATAPG1, which must be written on the next (the second) page PG1 of the empty block BLh, is prepared for the buffer 34A. Therefore, the write cycle TW can immediately be performed in the flash memory FM1, the write cycle TW being a cycle in which data DATAPG1 for one page saved (read from the second page PG1 of the block BLJ of the flash memory FM0 in the previous read cycle TR) in the buffer 34A is written on the second page PG1 of the empty block BLh.

Simultaneously with or in parallel to the write cycle TW in the flash memory FM1, the read cycle TR is performed in the flash memory FM0, the read cycle TR being a cycle in which data DATAPG2 for one page is, in the flash memory FM0, read from the third page PG2 of the block BLi.

Then, a similar operation is performed for the following pages PG2, PG3, . . . . During the execution of the write cycle TW in which data DATAPGk-1 for one page is, in the flash memory FM1, written on the k th page PGk-1 of the empty block BLh, the read cycle TR for reading data DATAPGk from the (k+1) th page PGk of the block BLj, which is the subject of rewriting, is not performed in the flash memory FM1. The reason for this is that new data DATAPGk, with which former data DATAPGk is replaced, and supplied from the host computer 14 has been prepared for the buffer 34B in the controller 10.

Also when the write cycle TW for writing data DATAPG15 for one page on the final (the sixteenth) page PG15 of the empty block BLh is performed in the flash memory FM1, the read cycle TR is not required because all of data items have been read in the flash memory FM0 from all of the pages of the source of data to be shifted.

After the foregoing data rewriting process has been performed, a post process is performed such that data in the block BLJ of the flash memory FM0, which is the (former) source block from which data is shifted at the current rewriting operation, is batch-deleted. To delete the block, the controller 10 supplies a predetermined block deletion command and address for indicating the block BLj to the flash memory FM0 at a predetermined timing. In response to the supply above, the operation for deleting the block BLj is performed in the flash memory FM0.

As a post process of the above-mentioned data rewriting operation, the address conversion table 28A and the empty block table 28B are, in the flash table controller 28, updated by a predetermined operation.

The address conversion table 28A is updated such that the physical address for instructing the block BLj in the flash memory FM0 is, as the physical block address corresponding to the logical block address [AD] LBA, BLj instructed at the current writing operation, deleted from the table 28A. As an alternative to this, physical address for instructing the block BLh in the flash memory FM1 is registered to the table 28A.

To update the empty block table 28B, physical address for instructing the block BLh in the flash memory FM1 as the empty block which does not contain data is deleted from the table 28B. As an alternative to this, physical address for instructing the block BLj in the flash memory FM0 is registered to the table 28B.

As described above, the data rewriting operation according to this embodiment, as shown in FIG. 12, has the structure such that the read cycle TR in the flash memory FM0 is, in a masked state, simultaneously or in parallel performed during the write cycle TW in the flash memory FM1. Therefore, the total rewriting time can be shortened to the time (16TW+TR) obtained by multiplying the write cycle TW by the number of repetition times (the number corresponding to the total number of pages PG0 to PG15 in one block: 16 times).

When a similar data rewriting operation is performed by the conventional system, the read cycle TR for reading data for one page from the block BLJ of the flash memory FM0, which is the source of the data shift, and the write cycle TW for writing read data for one page on the empty block BLh of the flash memory FM1 to which data is shifted are alternately (serially in viewpoint of time) repeated. Note that read cycle TR for reading former data for one page from the page PGk of the block BLj in the flash memory FM0, which is the subject of rewriting, is not required. Therefore, the total processing time is 16TW+15TR.

As described above, this embodiment is able to shorten (save) the time to perform the data rewriting operation by about 14TR. As a result, also data writing time, viewed from the host computer 14, can significantly be shortened. Thus, the performance of the flash disk system can significantly be improved.

Since the foregoing embodiment has the structure such that the individual and independent read (output) enable control lines XFRE0- to XFREn- are provided between the controller 10 and each of the flash memories FM0 to FMn, the controller 10 is able to fetch data from the arbitrary flash memory FM1 at any time (regardless of the state of another flash memory).

Therefore, the controller 10 is able to fetch read data DATAR from the flash memory FM0 through the buses FD0 to FD7 after the read command CMR and the read address ADR have been supplied to the flash memory FM0 regardless of the state of the flash memory FM1 to which data has been written, the fetching operation being enabled even if the write busy time tWB has been ended in the flash memory FM1 before the read cycle TR is ended in the flash memory FM0. Therefore, if the write busy time tWB in each flash memory FM1 is relatively short, or if the read busy time tRB is relatively long, the method according to the present invention can be employed.

In a case as shown in FIG. 9 in which the write busy time tWB in each flash memory is considerably longer than the read busy time tRB or if the read cycle TR can be reliably completed in another flash memory FMe during the write busy time tWB in a certain flash memory FM1, only one common read (output) enable control line XFRE- may be provided between the controller 10 and each of the flash memories FM0 to FMn.

Since the foregoing embodiment has the structure such that the individual or independent busy lines XFBSY0- to XFBSYn- are provided between the controller 10 and each of the flash memories FM0 to FMn, the controller 10 is able to instantaneously recognize start and end of the busy state in each flash memory FM1. Therefore, in the case shown in FIG. 9, the controller 10 is able to immediately recognize completion of the read busy time tRB in the flash memory FM0 individually from the flash memory FM1 in accordance with the busy signal XFBSY0- during the period in which the flash memory FM1 is in the write busy state (in a period in which the XFBSY1- is in an active state). Therefore, the controller 10 is able to immediately start fetching read data from the flash memory FM0.

However, the controller 10 is not required to receive the busy signal XFBSY0- from the flash memory FM0 to recognize the state of the flash memory FM0 by issuing the status register read command CMC to the flash memory FM0 and by reading a required status bit. Therefore, only one common busy signal line XFBSY- may be provided between the controller 10 and each of the flash memories FM0 to FMn.

The structure of the flash disk system according to the above-mentioned embodiment, and in particular, the internal structure of the flash memory FM1 and that of the controller 10 are described as examples. Therefore, the present invention can be applied to an arbitrary memory system having a structure in which a plurality of flash memories are connected to one controller or one computer through a common bus.

As described above, the method of writing/reading data to and from a memory and the memory reading control apparatus according to the present invention adapted to a memory system having a structure in which a plurality of flash memories are connected to the same bus is enabled to read data from an arbitrary flash memory in a state where data is being written on another flash memory. Therefore, the processing time can be shortened and the performance of the system can be improved.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data reading/writing method comprising:
    a first step of supplying a writing command, writing head address and first data to a first flash memory of a semiconductor memory device via a bus;
    a second step of writing the first data from a storage position of the first flash memory which is designated by the writing head address in response to the writing head address without fetching an external signal within a first time period;
    a third step of supplying a reading head address and a reading command to a second flash memory via the bus at a predetermined timing during the first time period;
    a fourth step of reading out sequentially second data from a storage position of a second flash memory which is designated by the reading head address, setting it to an output port during a second time period that is within the first time period in response to the reading command, and sending the second data at the output port to the bus in response to a read enable control signal assigned individually to the second flash memory via a line corresponding to the second flash memory; and
    a fifth step of fetching the second data being set at the output port of the second flash memory via the bus after an elapse of the second time period.

2. A memory control apparatus for controlling reading and writing of a plurality of flash memories, the memory control apparatus comprising:
    write control means for supplying a write command, a write head address and first data to each of the flash memories through a bus at a predetermined timing to cause one of the flash memories to perform a write mode for writing sequentially first data from a memory address of a corresponding one of the flash memories which is accessed by the write head address in response to the write command, the write head address and first data being supplied at a predetermined timing without fetching any external signal within a first time period;
    a plurality of read enable control signal lines connected to the plurality of flash memories, respectively, to assign individually a plurality of read enable control signals to the flash memories via the lines; and
    read control means for supplying a read command and a read head address to another one of the flash memories at a predetermined timing within a second time period which is at least shorter than the first time period through the bus to cause the another one of the flash memories to perform a read mode for reading sequentially second data from a memory address of the another one of the flash memories which is accessed by the read head address in response to the read command within the second time period, set the second data to an output port, and send the second data at the output port to the bus in response to an assigned one of the read enable control signals which is assigned via a corresponding one of the signal lines.

3. The memory reading control apparatus according to claim 2, wherein the write control means and the read control means include busy lines for the flash memories in order to individually recognize whether or not each of the flash memories is in a busy state.

4. A memory system comprising:
    a host apparatus generating various commands and addresses; and
    a semiconductor memory unit detachably coupled to the host apparatus;
    the semiconductor memory unit comprising:
        a plurality of flash memories including at least one first flash memory and at least one second flash memory; and
        a control section connected to the flash memories by a bus for controlling reading and writing of the flash memories according to the commands and addresses from the host apparatus,
        wherein the control section comprises:
            write control means for supplying a write command, a write head address and first data to the first flash memory through a bus at a predetermined timing to cause the first flash memory to perform a write mode for writing sequentially the first data from a memory address of the first flash memory which is accessed by the write head address in response to the write command, the write address and first data being supplied at a predetermined timing without fetching any external signal within a first time period;

a plurality of read enable control signal lines connected to the plurality of flash memories, respectively, to assign individually a plurality of read enable control signals to the flash memories via the lines; and read control means for supplying a read command and a read head address to the second flash memory at a predetermined timing that is within a second time period which is at least shorter than the first time period through the bus to cause the second flash memory to perform a read mode for reading sequentially second data from a memory address of the second flash memory which is accessed by the read head address in response to the read command within the second time period, set the second data to an output port, and send the second data at the output port to the bus in response to an assigned one of the read enable control signals.

5. A memory control apparatus for use to control read and write of a plurality of flash memories including at least one first flash memory and at least one second flash memory, the memory control apparatus comprising:

write control means for supplying a write command, a write head address and first data to the first flash memory through a bus at a predetermined timing to cause the first flash memory to perform a write mode for writing sequentially the first data to a memory address of the first memory which is accessed by the write head address in response to a write command, the write address and first data being supplied at a predetermined timing without fetching any external signal within a first time period;

a plurality of read enable control signal lines connected to the first and second flash memories, respectively, to assign individually a plurality of read enable control signals to the flash memories via the lines; and read control means for supplying a read command and a read head address to the second flash memory at a predetermined timing within a second time period through the bus when the first flash memory is in the first time period so as to fetch the second data from an output port of the second flash memory through the bus after the second predetermined time period has elapsed, wherein the read control means includes means for assigning a plurality of read enable control signals to the flash memories, respectively, to individually bring each of the flash memories into an output enable state.

6. A memory control apparatus for controlling reading and writing of a plurality of flash memories, the memory control apparatus comprising:

a write control section configured to supply a write command, a write head address and first data to each of the flash memories through a bus at a predetermined timing to cause one of the flash memories to perform a write mode for writing sequentially first data from a memory address of a corresponding one of the flash memories which is accessed by the write head address in response to the write command, the write head address and first data being supplied at a predetermined timing without fetching any external signal within a first time period;

a plurality of read enable control signal lines connected to the plurality of flash memories, respectively, to assign individually a plurality of read enable control signals to the flash memories via the signal lines; and a read control section configured to supply a read command and a read head address to another one of the flash memories at a predetermined timing within a second time period which is at least shorter than the first time period through the bus to cause the another one of the flash memories to perform a read mode for reading sequentially second data from a memory address of the another one of the flash memories which is accessed by the read head address in response to the read command within the second time period, set the second data to an output port, and send the second data at the output port to the bus in response to an assigned one of the read enable control signals.

7. The memory reading control apparatus according to claim 6, wherein the write control means and the read control means include busy lines for the flash memories in order to individually recognize whether or not each of the flash memory is in a busy state.

8. A memory system comprising:

a host apparatus generating various commands and addresses; and a semiconductor memory unit detachably coupled with the host apparatus;

the semiconductor memory unit comprising:

a plurality of flash memories including at least one first flash memory and at least one second flash memory; and a control section connected to the flash memories by a bus for controlling reading and writing of the flash memories according to the commands and addresses from the host apparatus, wherein the control section comprises:

a write control section configured to supply a write command, a write head address and first data to the first flash memory through a bus at a predetermined timing to cause the first flash memory to perform a write mode for writing sequentially the first data from a memory address of the first flash memory which is accessed by the write head address in response to the write command, the write address and first data being supplied at a predetermined timing without fetching any external signal within a first time period;

a plurality of read enable control signal lines connected to the plurality of flash memories, respectively, to assign individually a plurality of read enable control signals to the flash memories via the signal lines; and a read control section configured to supply a read command and a read head address to the second flash memory at a predetermined timing that is within a second time period which is at least shorter than the first time period through the bus to cause the second flash memory to perform a read mode for reading sequentially second data from a memory address of the second flash memory which is accessed by the read head address in response to the read command within the second time period, set the second data to an output port, and send the second data at the output port to the bus in response to an assigned one of the read enable control signals.

9. A memory control apparatus for use to control read and write of a plurality of flash memories including at least one first flash memory and at least one second flash memory, the memory control apparatus comprising:

a write control section configured to supply a write command, a write head address and first data to the first flash memory through a bus at a predetermined timing to cause the first flash memory to perform a write mode for writing sequentially the first data to a memory address of the first memory which is accessed by the write head address in response to a write command, the write address and first data being supplied at a predetermined timing without fetching any external signal within a first time period;

a plurality of read enable control signal lines connected to the plurality of flash memories, respectively, to assign individually a plurality of read enable control signals to the flash memories via the signal lines; and a read control section configured to supply a read command and a read head address to the second flash memory at a predetermined timing within a second time period through the bus when the first flash memory is in the first time period so as to fetch the second data from an output port of the second flash memory through the bus after the second predetermined time period has elapsed, wherein the read control section includes an assigning section configured to assign a plurality of read enable control signals to the flash memories, respectively, to individually bring each of the flash memories into an output enable state.

* * * * *